United States Patent [19]

Boom

[11] Patent Number: 4,478,722
[45] Date of Patent: Oct. 23, 1984

[54] PROCESS FOR SEPARATING SALTS IN AQUEOUS STREAMS

[75] Inventor: W. Steven Boom, Midland, Mich.

[73] Assignee: The Dow Chemical Company, Midland, Mich.

[21] Appl. No.: 538,887

[22] Filed: Oct. 4, 1983

[51] Int. Cl.³ .............................................. B01D 15/04
[52] U.S. Cl. .................................... 210/672; 210/673; 210/686
[58] Field of Search ......................... 210/672, 673, 686

[56] References Cited

U.S. PATENT DOCUMENTS 3,041,292  6/1962  Hatch ..................................... 521/32
4,235,717  11/1980  Lee et al. ............................. 210/685

Primary Examiner—Ivars Cintins

[57] ABSTRACT

An improved ion retardation method for separating mixtures of salts in aqueous solution is disclosed. In this method, an ion retardation resin containing excess strong base groups is employed wherein the strong base groups have associated therewith a counteranion for which the strong base group has less affinity than for the anion of the salt which is last eluted from the resin.

6 Claims, 3 Drawing Figures

PROCESS FOR SEPARATING SALTS IN AQUEOUS STREAMS

BACKGROUND OF THE INVENTION

This invention relates to an ion retardation method for separating mixtures of salts from aqueous solutions.

It is often desirable when two or more salts are dissolved in an aqueous medium to separate the salts in order to obtain at least one of the salts in relatively pure form. Such separation is especially difficult when the salts contain a common cation such as, for example, sodium hydroxide and sodium chloride. However, in many industries, it is critical to prepare sodium hydroxide solutions which have as little chloride ion as possible. For example, in the preparation of ion exchange resins to be used as condensate polishers in the nuclear power industry, it is essential to prepare such resins with the smallest possible amount of chloride ion as the presence of chloride ion leads to stress corrosion and other problems within the nuclear reactor. Accordingly, such resins are advantageously prepared in the hydroxide form, using sodium hydroxide solutions which are free of chloride ion.

It has long been known that such separation of salts may be achieved through an ion retardation process. In such process, an aqueous solution containing the salts is passed through a bed of an ion retardation resin which retards the passage of one salt therethrough in relation to the other. Thus, the eluate from the resin bed will comprise a first fraction which is rich in one salt and a second fraction which is rich in the other salt.

The ion retardation resin is a so-called "snake-cage polyelectrolyte" as discussed in an article in *Industrial and Engineering Chemistry*, Vol. 49, No. 11, November 1957, pages 1812–1819, entitled "Preparation and Use of Snake Cage Polyelectrolytes" by M. J. Hatch, J. A. Dillon and H. P. Smith. Such snake cage polyelectrolytes comprise a crosslinked polymer which contains pendant strong base groups which polymer further contains a second polymer, usually linear, which contains a plurality of pendant weakly acidic groups. In such snake cage polyelectrolytes the strongly basic groups and weakly acidic groups become ionically associated with each other. However, due to an excess of strong base groups or steric factors, some of the strong base groups do not become associated with a weak acid group. The presence of these unassociated strong base groups leads to a reduction of the ability of the resin to separate salts. As a result, some "leakage" of the undesired salt into the eluant fraction containing the desired salt occurs.

Previous attempts to reduce the amount of such leakage have focused on reducing the amount of unassociated strong base groups (hereinafter referred to as $\Delta C^+$) in the resin. See, for example, U.S. Pat. Nos. 4,154,801 and 4,235,717. Typically, this is achieved by employing a large excess of the acid group-containing polymer. Unfortunately, however, such ion retardation resins having very low $\Delta C^+$ are difficult to prepare and in use still do not separate salts completely.

Accordingly, it would be desirable to provide a method for separating mixtures of salts in aqueous solutions whereby very clean, efficient separation of said salts is achieved.

FIGS. 1 and 2 are graphical representatives of the elution curves of salt, separated according to the method of the invention. FIG. 3 is a graphical representation of the elution curves of salts separated according to a conventional process.

SUMMARY OF THE INVENTION

This invention is an improved process for separating two or more salts from an aqueous solution. In this process, the aqueous solution containing said salts is contacted with an ion retardation resin and the resin is then eluted to recover a first eluate fraction containing a major portion of one salt and subsequent fractions containing a major portion of the other salts. In this invention, the ion retardation resin is a porous polymeric particulate containing pendant strong base groups in association with pendant weak acid groups and further containing excess strong base groups which are not in association with weak acid groups. Such excess strong base groups have associated therewith an anion for which the strong base group has less affinity than it does for the anion of the salt or salts contained in the later appearing eluate fractions. Surprisingly, it is found that even though the resin employed herein contains substantial $\Delta C^+$, this invention affords superior separation of salts than has heretofore been achieved.

Detailed Description of the Invention

Figure 1:
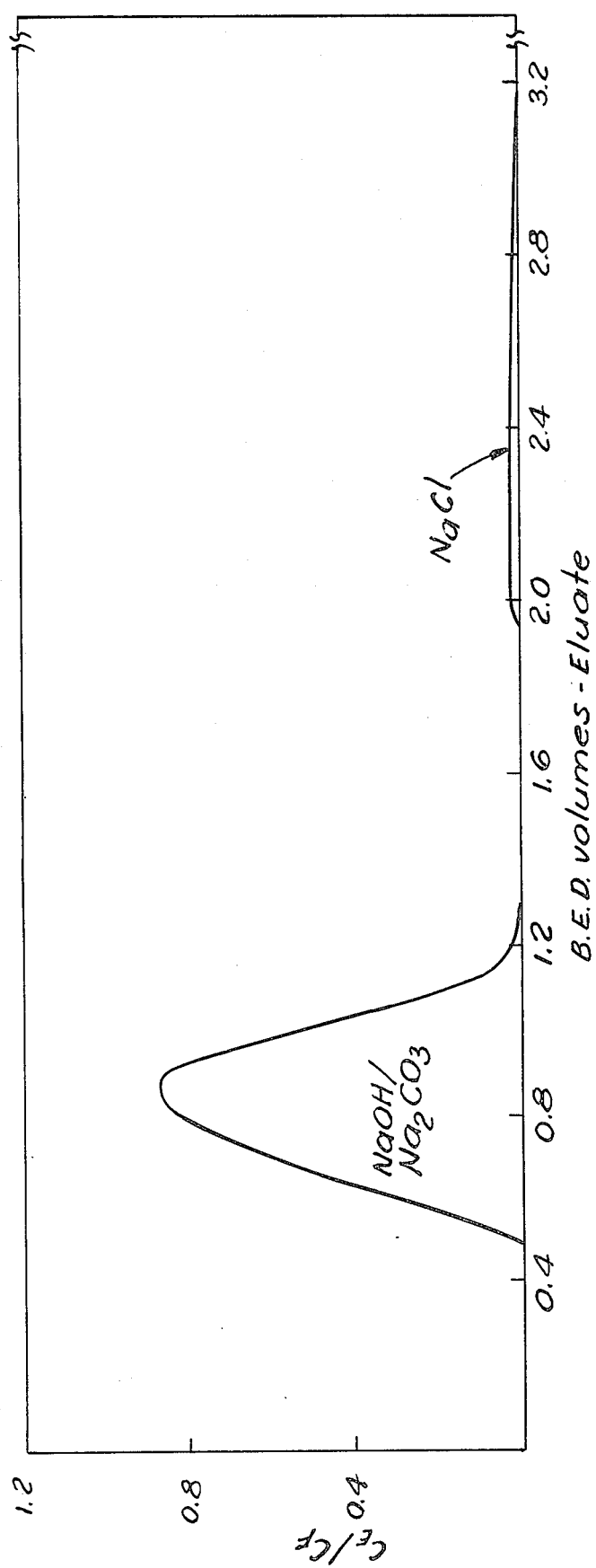

The separation of salts contained in aqueous solution by ion retardation is well known and described in, for example, U.S. Pat. Nos. 3,078,140; 4,184,801 and 4,235,717. Typically, an aqueous solution containing the salt is contacted with the ion retardation resin, followed by elution of the resin with water. Each salt passes through the ion retardation bed at a rate which is independent of the rates of passage of the other salt or salts. The major portion of one salt is present in the earlier appearing eluate fractions while the later appearing fractions contain the major portion of the other salt or salts. The efficiency of the separation depends on how widely separated are the fractions containing the major portion of the earlier appearing and later appearing salts. Ideally, essentially all of the earlier appearing salt is eluted from the resin before the appearance of any of the later appearing salts.

The aqueous solution can contain said salts in a rather wide range of concentrations. The best results are generally obtained when more concentrated solutions, i.e., more than 1.0N in at least one salt, are employed. Said solution may be saturated in one or more of said salts, if desired. For the purification of sodium hydroxide and other alkali metal hydroxides, the aqueous solution often contains from about 5 to about 50 weight percent of alkali metal hydroxide.

The separation may be performed at any temperature above the freezing point of the aqueous solution being treated or at any higher temperature at which the aqueous solution or eluant does not boil or the resin is not degraded. Typically, temperatures in the range from about 10°–35° C. are preferred.

The eluant employed is typically water although other eluants such as water/alcohol mixtures or organic compounds in which the salts are soluble may be employed. Preferably, the eluant is deionized water.

The eluant is flowed through the column at any desirable flow rate which is sufficiently slow to permit the salts to be separated by the ion retardation resin. In general, slow flow rates give better separations, but for economic reasons, flow rates of less than about 0.1 bed volumes per hour are usually impractical. Preferably, a flow rate of about 0.1 to about 25, more preferably from about 0.2 to about 15, most preferably about 1.0 to 10 bed volumes per hour. To obtain flow rates above about 5 bed volumes per hour, it is generally necessary to pump the eluent through the resin bed under pressure.

The ion retardation resin employed herein is a porous polymeric particulate containing both pendant strong base groups and weak acid groups. In such resin, the major portion of such strong base groups are ionically associated with the weak acid group. However, a minor but measurable portion of such strong base groups are not associated with weak acid groups and are therefore available as active ion exchange sites. Such unassociated strong base groups are hereinafter called excess strong base groups or $\Delta C^+$ for the sake of brevity.

Such excess strong base groups have a counterion associated therewith. In this invention, said counterion is selected such that the excess strong base group have a lesser affinity for the counteranion than for the anion of the salt (and/or salts) which is last eluted from the resin. For example, in the separation of sodium hydroxide and sodium chloride, sodium chloride is the last salt to be eluted from the resin. Accordingly, the counteranion must be one for which the excess strong base groups have less affinity than for chloride ion, such as carbonate. Similarly, if a sulfate salt and a chloride salt are to be separated, the counterion must be one like acetate ion for which the resin has less affinity than for chloride.

By "having less affinity for the counteranion than the ion of the last eluted salt" is meant that the strong base group will more preferentially form a salt with the anion of the last eluted salt than with the counteranion. Accordingly, when the strong base group (in the counteranion form) is contacted with an aqueous solution containing the salts to be separated and eluted, the resin will exchange the counteranion for the anion of the last eluted salt. Accordingly, the excess strong base capacity helps to further retard the passage of the last eluted salt through the resin, thus increasing the efficiency of the separation.

Typically, the ion retardation resin employed in this invention will have a $\Delta C^+$ of at least about 0.01 milliequivalent per milliliter (meq/ml) of wet resin, preferably, from about 0.01 to about 1 meq/ml, more preferably from about 0.05 to about 0.5 meq/ml.

The selectivity of the excess strong base group for any particular anion depends somewhat on the particular strong base group employed, the resin, matrix and like factors. However, Wheaton and Bauman in *Industrial Engineering Chemistry*, Vol. 43, page 1088 (1951), identify the following selectivity sequence of general purpose anion exchange resins: salicylate>iodide>-phenol>bisulfate>nitrate>bromide>cyanide>bisulfite>nitrate>chloride>bicarbonate>diahydrogen phosphate>formate>acetate>aminoacetate hydroxide>fluoride. In addition, ion exchangers in general tend to prefer the counterion having the highest valence, that having the smallest hydrated equivalent volume, that with the greater polarizability, that which interacts more strongly with the fixed ionic groups or with the matrix and that which participates least in complex formation with the coanion (i.e., the cation in solution).

The counterion is eluted either simultaneously with the first eluted salt, or between the appearance of the first and last eluted salts. If the counterion is eluted simultaneously with the first eluted salt, it is advantageously one the appearance of which in the first eluted salt is not especially undesirable. For example, in the purification of sodium hydroxide in accordance with this invention to remove corrosive salts such as sodium chloride and/or sodium sulfate therefrom, carbonate ion is a suitable coanion since the appearance of carbonate salt in the sodium hydroxide does not lead to the corrosive activity associated with chloride and sulfate anions.

In addition to the excess strong base capacity, the resin of this invention typically exhibits excess weak acid capacity due to the presence of weak acid groups therein which are not associated with any strong base groups. Typically, the excess weak acid capacity or $\Delta C^-$ will be in an amount in the range from about 0.1 to about 1.0, preferably from about 0.3 to about 0.75, meq/g of dry resin.

Suitable methods for preparing the ion retardation resin of this invention are described in U.S. Pat. No. 3,041,292 to Hatch. Such methods previously described comprise preparing porous crosslinked copolymer beads which contain or can be made to contain strongly basic anion exchange groups. Such copolymer beads are then caused to imbibe a monomeric mixture comprising at least one monomer which contains or can be made to contain weak acid groups. The imbibed monomer mix is then polymerized within the pores of the copolymer beads. Preferably, an anion exchange resin comprising crosslinked polyvinyl aromatic polymers having pendant ammonium groups attached thereto is employed as a starting material. The monomer mix preferably contains an $\alpha,\beta$-ethylenically unsaturated carboxylic acid or acid anhydride. Upon polymerization of the imbibed monomer mix, a polymer is formed within the copolymer beads which polymer contains a plurality of weak acid groups. This weak acid group-containing polymer may be linear or crosslinked as desired. It is noted that when acid anhydride-containing monomers are used, the resulting polymer must be hydrolyzed to convert the anhydride groups to acid groups.

Although the ion retardation resin made according to the foregoing method will comprise two intimately associated polymers, it is understood that an ion retardation resin containing a single polymer backbone and having both pendant strong base and weak acid groups would be suitably employed herein as long as the essential criteria described hereinbefore are met.

The method of this invention may be applied to separate mixtures of diverse types of salts. Said salts may be salts of strong or weak acids and strong or weak base as desired. Advantageously, the salts have a common cation such as sodium chloride and sodium hydroxide which both contain sodium cation.

The method of this invention can also be applied to cause metathesis reactions. For instance, the invention can be applied to produce magnesium bromide hexahydrate and sodium chloride from aqueous solution prepared by dissolving sodium bromide dihydrate in its chemical equivalent of magnesium chloride hexahydrate in water even though on a molar basis the starting compounds are less soluble in water at room temperature than are the respective products. In such application, the $\Delta C^+$ groups are advantageously in the bromide form.

In general, the method of this invention can be employed to separate mixtures of salts which can be separated using conventional ion retardation methods. For example, in U.S. Pat. No. 3,078,140 to Hatch, there are described diverse salt mixtures which can be separated using an ion retardation process.

The following examples are provided to illustrate the invention but not to limit the scope thereof. All parts and percentages are by weight unless otherwise indicated.

EXAMPLE 1

To a 3-liter flask are added 210 g of water, 300 g of a styrene/divinyl benzene ion exchange resin containing trimethyl ammonium anion exchange groups (strong base capacity—4.1 meq Cl/g dry resin) and 50 g of acrylic acid. The resulting slurry is allowed to mix 1 hour at room temperature until the acrylic acid is imbibed by the resin. A free radical catalyst is then added and the mixture is heated to 55° C. for 30 minutes and then to 70° C. for 2 hours. The mixture is then cooled to 50° C. and 300 g of a 10 weight percent aqueous NaOH solution is added, followed by mixing 2 hours at 50° C. The resulting mixture is filtered and washed in water. Then, the resin is stirred in water containing 70 g of salt for ½ hour, washed and dried.

A 75-ml portion of the resulting retardion resin is charged into a glass column and eluted slowly with 20 bed volumes of a 1 percent solution of a soluble carbonate salt. The resin is then rinsed with 20 bed volumes of deionized water and charged into a 1.3 cm diameter glass column. To the resin is then added 25 ml of an aqueous feed solution having 21 percent sodium hydroxide and 3400 ppm chloride (as sodium chloride). Then, 4 bed volumes of deionized water are passed through the column at the rate of 3.0 ml/minute. Samples are collected throughout the operation and assayed for hydroxide and chloride content by acid titration and a chloride meter, respectively. The ratio of effluent to feed concentration of sodium hydroxide and chloride are plotted versus the bed volumes of total eluant through the column. The results are as shown graphically in FIG. 1. The carbonate anion originally contained on the excess strong base groups of the resin are contained in the product sodium hydroxide. As can be seen, excellent separation of the sodium hydroxide and the sodium chloride are obtained using this method.

EXAMPLE 2

Figure 2:
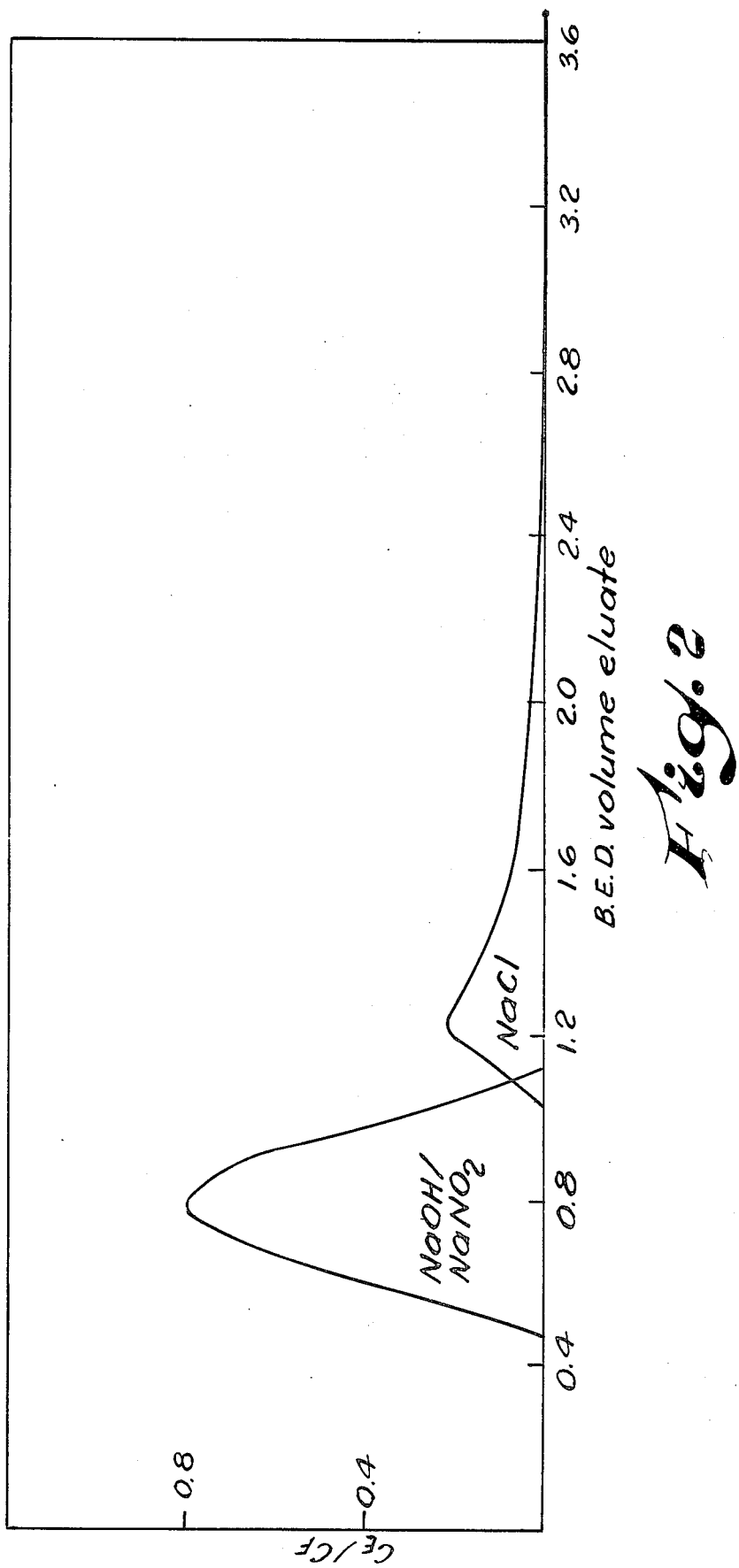

A sample of ion retardation resin as in Example 1 is employed in this example except this time the resin is in the nitrite form. This resin is used to separate sodium hydroxide from sodium chloride as described in Example 1, with the results as shown graphically in FIG. 2. Again, excellent separation of the salts are obtained.

EXAMPLE 3 (Comparative Sample)

Figure 3:
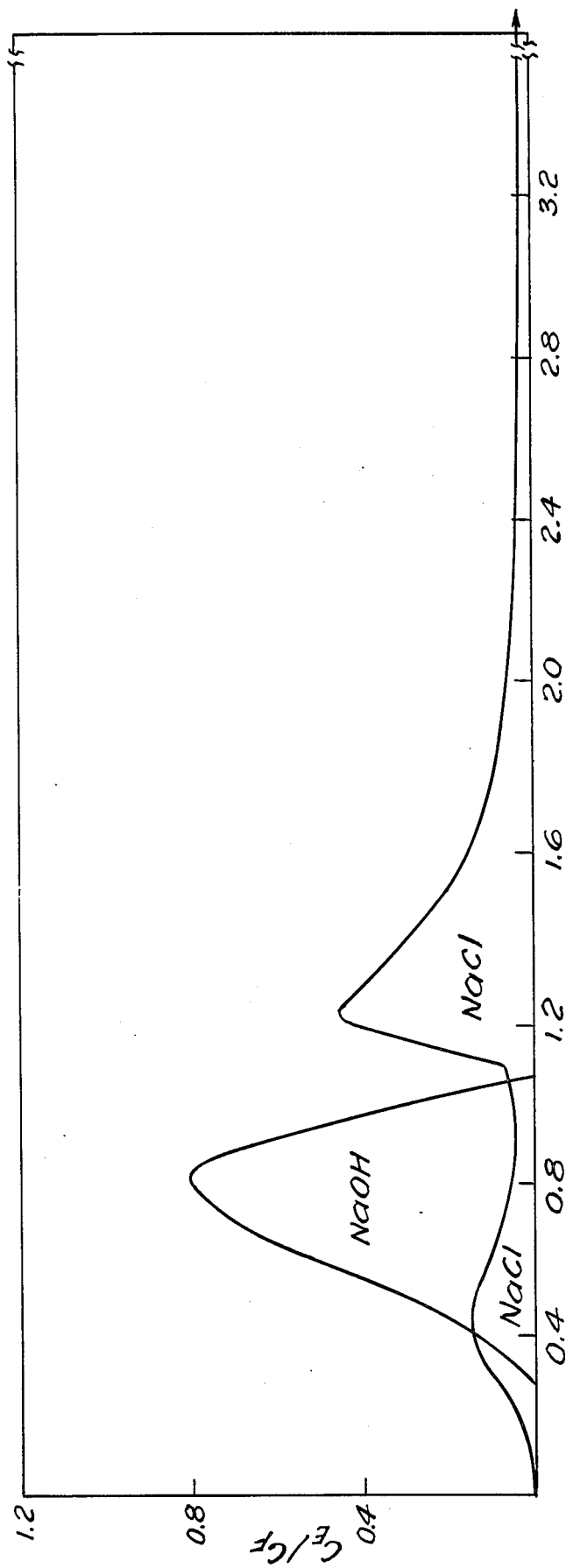

An ion retardation resin sample as in Example 1, but this time in the chloride form is employed as described in Example 1 to separate NaOH from NaCl. The results are as shown graphically in FIG. 3. In this example, it is seen that quite significant leakage of the NaCl into the NaOH occurs.

What is claimed is:

1. In a process for separating two or more salts comprising contacting an aqueous solution containing said salts with an ion retardation resin and then eluting the resin to recover a first eluant fraction which is rich in a first salt and at least one subsequent eluant fraction which is rich in another salt, the improvement comprising employing as the ion retardation resin a porous polymeric particulate containing a plurality of strong base groups which are in association with weak acid groups and a plurality of excess strong base groups which are not in association with weak acid groups, which excess strong base groups have associated therewith a counterion which is an anion for which the strong base group has less affinity than for the anion of the salt which appears in said subsequent eluant fraction.

2. The process of claim 1 wherein the ion retardation resin contains from about 0.05 to about 0.5 meq of excess of strong base groups per milliliter of wet resin.

3. The process of claim 1 wherein the resin is eluted with water.

4. The process of claim 1 wherein the salts to be separated comprise sodium chloride and sodium hydroxide and the counteranion is carbonate ion or nitrite ion.

5. The process of claim 1 wherein the ion retardation resin comprises a crosslinked polymer containing pendant strong base groups and a second polymer containing weak acid groups, which second polymer is in intimate association with said first polymer.

6. The process of claim 1 wherein the strong base groups are quaternary ammonium groups and the weak acid groups are carboxylate groups.

* * * * *